United States Patent
Mikail et al.

(10) Patent No.: US 9,236,820 B2
(45) Date of Patent: Jan. 12, 2016

(54) SYSTEM FOR REDUCING TORQUE RIPPLE IN AN ELECTRIC MOTOR

(71) Applicants: Rajib Mikail, Raleigh, NC (US); Mohammad S. Islam, Saginaw, MI (US); Yilmaz Sozer, Stow, OH (US); Iqbal Husain, Cary, NC (US)

(72) Inventors: Rajib Mikail, Raleigh, NC (US); Mohammad S. Islam, Saginaw, MI (US); Yilmaz Sozer, Stow, OH (US); Iqbal Husain, Cary, NC (US)

(73) Assignees: STEERING SOLUTIONS IP HOLDING CORPORATION, Saginaw, MI (US); THE UNIVERSITY OF AKRON, Akron, OH (US)

( * ) Notice: Subject to any disclaimer, the term of this patent is extended or adjusted under 35 U.S.C. 154(b) by 168 days.

(21) Appl. No.: 13/792,808

(22) Filed: Mar. 11, 2013

(65) Prior Publication Data

US 2014/0253002 A1 Sep. 11, 2014

(51) Int. Cl.
- *H02P 7/00* (2006.01)
- *H02P 6/10* (2006.01)
- *H02P 25/08* (2006.01)
- *B62D 5/04* (2006.01)

(52) U.S. Cl.
CPC *H02P 6/10* (2013.01); *B62D 5/046* (2013.01); *H02P 25/088* (2013.01)

(58) Field of Classification Search
CPC ...................................... H02P 7/00; H02P 1/24
USPC .......... 318/700, 701, 400.01, 400.02, 400.14, 318/400.15, 721, 799, 800, 801, 430, 432, 318/400.22, 437; 388/930, 800
See application file for complete search history.

(56) References Cited

U.S. PATENT DOCUMENTS

| | | | | |
|---|---|---|---|---|
| 5,998,952 A | * | 12/1999 | McLaughlin | H02P 25/088 318/432 |
| 6,646,407 B2 | * | 11/2003 | Rahman et al. | 318/701 |
| 6,756,757 B2 | * | 6/2004 | Marcinkiewicz et al. | 318/432 |
| 8,080,969 B2 | * | 12/2011 | Koenig | 318/701 |
| 9,024,556 B2 | * | 5/2015 | Henderson et al. | 318/400.23 |

OTHER PUBLICATIONS

Ishikawa, H., Kamada, Y. and Naitoh, H. Instantaneous Current Profile Control for Flat Torque of Switched Reluctance Motors. Electrical Engineering in Japan, vol. 163, No. 3, 2008, pp. 78-87 (translated from Denki Gakkai Ronbunshi, vol. 125-D, No. 12, Dec. 2005, pp. 1113-1121).

Ishikawa, H., Kamada, Y. and Naitoh, H. Instantaneous Torque Regulation for Switched Reluctance Motors for the Use in EVs. AMC 2004—Kawaski, Japan. pp. 65-69.

(Continued)

*Primary Examiner* — Antony M Paul
(74) *Attorney, Agent, or Firm* — Cantor Colburn LLP (57) ABSTRACT

A motor control system is provided. The motor control system includes a motor, a position sensor, a current sensor, and a control module. The motor has a rotor and a stator. The motor generates an output torque based on a phase current applied to the motor. The output torque generated by the motor creates a torque ripple that is within a predefined range. The position sensor monitors the motor to determine a rotor position. The current sensor monitors the motor to determine the phase current. The control module is in communication with the motor, the position sensor, and the current sensor. The control module includes a lookup table that stores values of phase current commands. The control module determines a phase current command from the lookup table based on the rotor position and the phase current.

11 Claims, 6 Drawing Sheets

(56) References Cited

OTHER PUBLICATIONS

Shirahase, M. et al. Torque Ripple Reduction of SRM by Optimization of Current Reference. The 2010 International Power Electronics Conference. 2010. pp. 2501-2507.

Ishikawa, H., Kamada, Y. and Naitoh, H. Instantaneous Current Profile Control for Flat Torque of Switched Reluctance Motors. Electrical Engineering in Japan, vol. 163, No. 3, 2008 (translated from Denki Gakkai Ronbunshi, vol. 125-D, No. 12, Dec. 2005, pp. 1113-1121).

Ishikawa, H., Kamada, Y. and Naitoh, H. Instantaneous Torque Regulation for Switched Reluctance Motors for the Use in EVs. AMC 2004—Kawaski, Japan.

* cited by examiner

FIG. 9 a
SYSTEM FOR REDUCING TORQUE RIPPLE IN AN ELECTRIC MOTOR

BACKGROUND OF THE INVENTION

The present invention relates to a control system for a motor, and more particularly to a control system for applying phase current to the motor.

A switched reluctance motor (SRM) is a type of electric motor that converts reluctance torque into mechanical power. SRMs are relatively tolerant to faults (e.g., no braking torque under a short circuit fault and no shoot-through fault in an inverter circuit). SRMs do not include magnets, and therefore do not produce a cogging torque (cogging torque is created by an interaction between permanent magnets of a rotor and stator slots). Moreover, SRMs also have a relatively high operational temperature, concentrated motor windings, and a relatively simple and rugged construction. However, SRMs also produce a relatively high torque ripple as well as acoustic noise. Torque ripple is typically defined as a periodic increase or decrease in output torque of an output shaft of the SRM.

Electric motors utilized in electric power steering (EPS) applications are generally required to produce relatively low torque ripple and low acoustic noise. Thus, the torque ripple and the acoustic noise produced by an SRM may need to be reduced before being used in an EPS application.

SUMMARY OF THE INVENTION

In one embodiment, a motor control system is provided. The motor control system includes a motor, a position sensor, a current sensor, and a control module. The motor has a rotor and a stator. The motor generates an output torque based on a phase current applied to the motor. The output torque generated by the motor creates a torque ripple that is within a predefined range. The position sensor monitors the motor to determine a rotor position. The current sensor monitors the motor to determine the phase current. The control module is in communication with the motor, the position sensor, and the current sensor. The control module includes a lookup table that stores values of phase current commands. The phase current commands are configured for generating the torque ripple that is within the predefined range by the motor. The control module determines a phase current command from the lookup table based on the rotor position and the phase current. The phase current command indicates the phase current applied to the motor. The control module sends a control signal based on the phase current command to the motor to generate the output torque.

In another embodiment, a method of controlling a motor is provided, where the motor generates an output torque based on a phase current applied to the motor. The method includes determining a rotor position of the motor. The method includes determining the phase current applied to the motor. The method includes determining a phase current command from a lookup table based on the rotor position and the phase current by a control module. The phase current commands are configured for generating the torque ripple that is within the predefined range by the motor. The lookup table stores values of phase current commands. The method includes sending a control signal based on the phase current command to the motor. The method includes generating the output torque by the motor, the output torque creating a torque ripple that is within a predefined range.

In yet another embodiment, a motor control system having a motor, a position sensor, and a control module are provided. The motor has a rotor and a stator. The motor generates an output torque based on a torque command signal applied to the motor. The position sensor monitors the motor to determine a rotor position of the motor. The control module is in communication with the motor and the position sensor. The control module receives as input the rotor position and the torque command signal. The torque command signal is based on the instantaneous reference current. The control module sends the torque command signal to the motor. The output torque generated by the motor creates a torque ripple that is within a predefined range.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
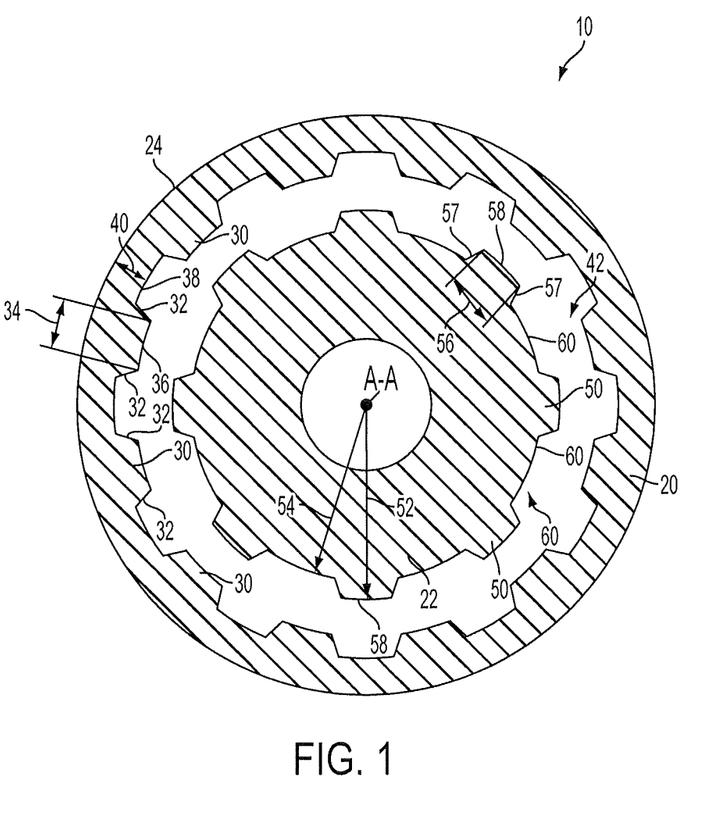
FIG. 1 is a cross-sectioned view of a motor in accordance with an exemplary embodiment of the invention.

Referring now to the Figures, where the invention will be described with reference to specific embodiments, without limiting same, FIG. 1 is cross sectioned view of a motor 10. In one exemplary embodiment, the motor 10 may be a switched reluctance motor (SRM). However, it is to be understood that any type of electric motor where an output torque produced by the electric motor is directly related to an individual phase of current supplied to the electric motor may be used as well. In one approach, the motor 10 may be used in an electric power steering (EPS) system, however, it is to be understood that the motor 10 may be used in a variety of other applications as well. The motor 10 includes a stator 20 and a rotor 22.

The stator 20 includes an outer stator periphery or edge 24 and a plurality of inwardly extending stator poles 30. Each of the stator poles 30 include generally opposing sides 32, and a stator pole width 34. In one embodiment, the sides 32 of the stator poles 30 may be oriented or tapered inwardly towards a center axis A-A of the motor 10. The stator pole width 34 is measured from an innermost edge 36 of one of the stator poles 30, where the innermost edge 36 represents a surface of the stator pole 30 positioned or oriented closest to the center axis A-A. The stator 20 also includes a stator yoke thickness 40. The stator yoke thickness 40 is measured between the outer stator edge 24 and a trough 38 located between two of the stator poles 30.

The rotor 22 is received within an aperture 42 of the stator 20 and includes a plurality of outwardly extending poles 50, an outer rotor radius 52, and an inner rotor radius 54. The outer rotor radius 52 and the inner rotor radius 54 are both measured with respect to the center axis A-A of the motor 10. Each of the rotor poles 50 include a rotor pole width 56, generally opposing sides 57, and an outermost edge 58. The outermost edge 58 represents a surface of the rotor pole 50 positioned or oriented furthest away from the center axis A-A. The outer rotor radius 52 is measured from the outermost edge 58 of one of the rotor poles 50. The inner rotor radius 54 is measured along a trough 60 located between two of the rotor poles 50. The rotor pole width 56 is measured from an outermost edge 58 of one of the rotor poles 50.

Figure 2:
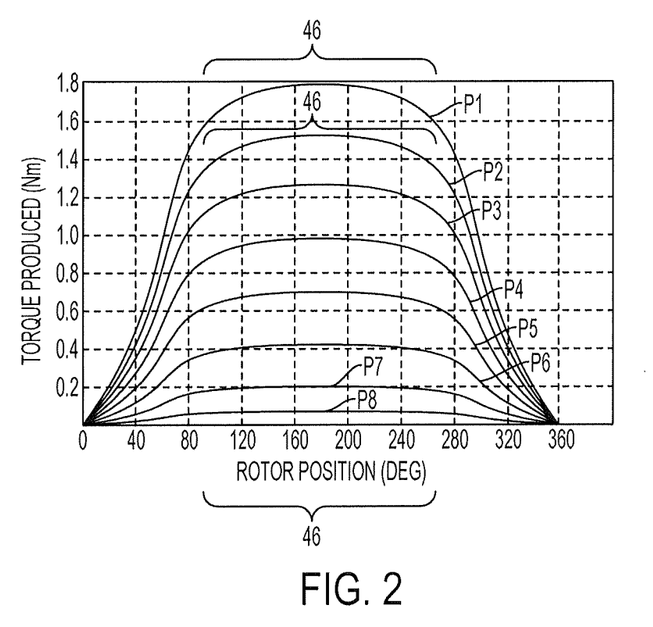
FIG. 2 is a graph illustrating exemplary torque-current-angle characteristics (also denoted T-i-θ) created by the motor shown in FIG. 1, in accordance with another exemplary embodiment of the invention.
Figure 6:
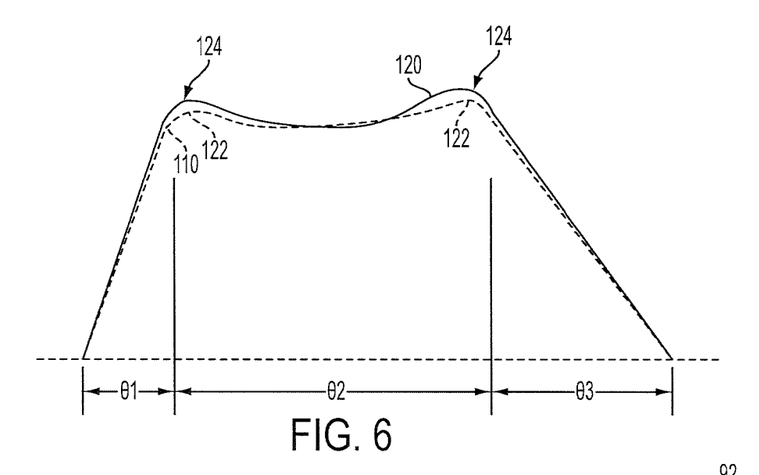
FIG. 6 is an illustration of the adjusted profile shown in FIG. 5 and a final profile, in accordance with another exemplary embodiment of the invention.

FIG. 2 is a graph illustrating exemplary torque-current-angle characteristics (also denoted T-i-θ) created by the motor 10 shown in FIG. 1. The torque-current-angle characteristics may be determined during a parameter sweep of the motor 10, where the y-axis represents torque produced by the motor 10 (measured in Nm) and the x-axis represents rotor position of the motor 10 (measured in degrees). The graph illustrates multiple profiles P1-P8, where each profile represents fixed amount of current supplied to the motor 10 for a single phase. The parameter sweep of the motor 10 is performed by iteratively adjusting the amount of fixed current supplied to the motor 10, while other operational parameters of the motor 10 are constant. It should be noted that the exemplary torque-current-angle characteristics shown in FIG. 2 do not take into account mutual coupling effects produced by other current phases supplied to the motor 10. It should be noted that the torque-current-angle characteristics are used to determine a final current profile 120, which is shown in FIG. 6, and is described in greater detail below.

Referring now to both FIGS. 1-2, various dimensions of the motor 10 may be selected such that during the parameter sweep, the motor 10 produces torque profiles P1-P8 that are each substantially symmetrical with respect to the x-axis (e.g., the axis representing rotor position). Various dimensions of the motor 10 may also be selected such that a torque produced portion 46 of each profile P1-P8 is substantially flat with respect to the y-axis. For example, in one embodiment, the torque produced portion 46 of each of the torque profiles P1-P8 is substantially flat and does not vary by more than about +/−10 percent with respect to the y-axis. In the embodiment as shown in FIG. 2, the torque produced portion 46 of each of the torque profiles P1-P8 ranges from about ninety degrees to about two hundred and seventy degrees with respect to the x-axis (e.g., the torque produced portion 46 of each of the torque profiles P1-P8 has a span of about 180 degrees with respect to the x-axis). In one embodiment, the various dimensions of the motor 10 that may be selected to produce torque profiles P1-P8 include, for example, the stator pole width 34, the stator yoke thickness 40, the outer rotor radius 52, the inner rotor radius 54, and the rotor pole width 56.

Figure 3:
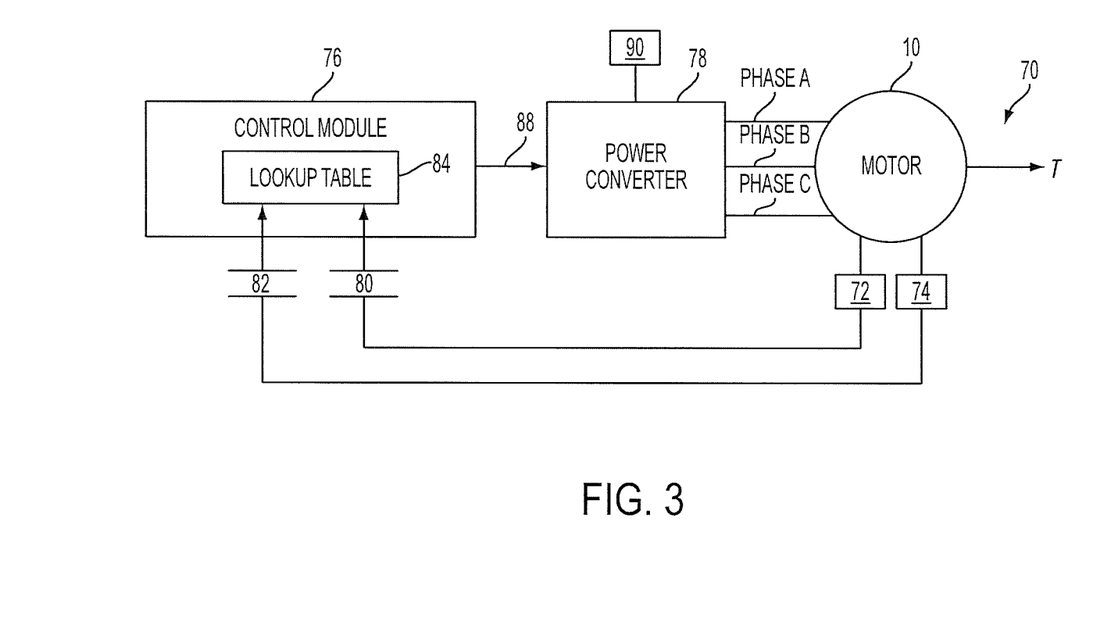
FIG. 3 is an exemplary block diagram illustrating a control system of the motor, in accordance with yet another exemplary embodiment of the invention.

FIG. 3 is a block diagram illustrating a control system 70 of the motor 10. The control system 70 includes the motor 10, a position sensor 72, a current sensor 74, a control module 76, and a power converter 78. The position sensor 72 may be used to determine the position or electrical angle or position of the rotor 22 of the motor 10 (FIG. 1). In one exemplary embodiment, the position sensor 72 may be a shaft angle transducer that generates a rotor position signal 80 that is indicative of the position of the rotor 22 (FIG. 1). The current sensor 74 detects phase current applied to coil windings (not shown) of the motor 10, and generates a phase current signal 82 indicative of the phase current applied to the motor 10.

The control module 76 controls the operation of the motor 10 through the power converter 78 based on the rotor position signal 80 and the phase current signal 82. In various embodiments, the control module 76 can include one or more sub-modules and datastores. As used herein the terms module and sub-module refer to an application specific integrated circuit (ASIC), an electronic circuit, a processor (shared, dedicated, or group) and memory that executes one or more software or firmware programs, or a combinational logic circuit that provide the described functionality.

The control module 76 receives as input the rotor position signal 80 from the position sensor 72, as well as the current signal 82 from the current sensor 74. The control module 76 is in communication with the power converter 78. The control module 76 generates a torque command signal 88 that is sent to the power converter 78. The torque command signal 88 is based on the rotor position signal 80 and the current signal 82. The power converter 78 is coupled to a power supply 90, and applies the phase current to stator windings (not shown) of the motor 10 in response to the torque command signal 88 received from the control module 76. In one exemplary embodiment, the motor 10 may be a three-phase motor where the current is applied in phases as phase A, phase B, and phase C. The motor 10 generates a torque output T based on the phase current applied by the power converter 78.

In the embodiment as shown in FIG. 3, the control module 76 includes a lookup table 84. The lookup table 84 stores values of phase current commands. The control module 76 determines a specific phase current command from the lookup table 84 based on the rotor position signal 80 and the current signal 82. The control module 76 may then convert or transform the current command value from the lookup table 84 into the torque command signal 88 that is sent to the power converter 78. In one embodiment, the current command values stored in the lookup table 84 have been determined empirically such that during operation of the motor 10, the torque output T generated by the motor 10 is substantially free of torque ripple. Torque ripple may be defined as a percentage in difference between a maximum torque $T_{max}$ and a minimum torque $T_{min}$ compared to an average torque $T_{avg}$ over a specified period of time, and may be calculated by Equation 1 as:

$$(T_{max}-T_{min}/T_{avg}) \times 100 = \text{Torque Ripple} \qquad \text{Equation 1}$$

Substantially free torque ripple may be defined as an amount of torque ripple that is within a predefined range. For example, in one embodiment substantially free torque ripple may be defined as torque ripple that does not exceed about two percent. However it is to be understood that the amount of torque ripple may vary based on the specific requirements of the motor 10. In another approach, substantially free torque ripple may be about zero percent.

Figure 4:
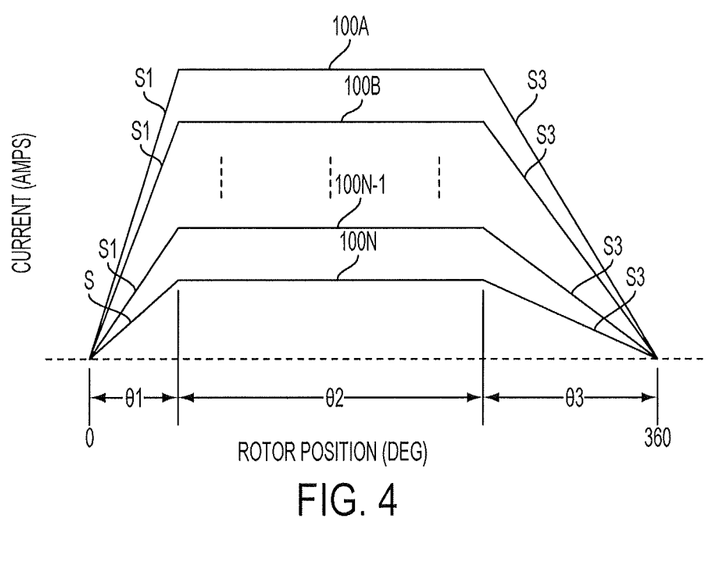
FIG. 4 is an illustration of a set of ideal current profiles for the motor shown in FIG. 1, in accordance with another exemplary embodiment of the invention.

In one embodiment, the current command values stored in the lookup table 84 may be determined by the approach described in FIGS. 4-7. Turning now to FIG. 4, a set of ideal current profiles 100A-100N of the motor 10 (FIG. 3) for a single phase of current (e.g., either phase A, phase B, or phase C shown in FIG. 3) are shown. Each ideal current profile 100A-100N generates a specific amount of torque when supplied to the motor 10 (FIG. 3). As the amount of current supplied to the motor 10 increases, so does the amount of torque produced by the motor 10. The ideal current profiles 100A-100N each include a first region of operation θ1, a second region of operation θ2, and a third region of operation θ3 based on a rotor position of the motor 10. Each ideal current profile 100A-100N also includes a sloped or angled profile in the first region of operation θ1 (which is denoted as S1 in FIG. 4) and the third region of operation θ3 (which is denoted as S3 in FIG. 4), and a substantially horizontal profile in the second region of operation θ2. The torque generated in the second region of operation θ2 by the motor 10 is generally constant.

The slope S1 of the first region of operation θ1 and the slope S3 of the third region of operation θ3 are based on specific torque-speed characteristics of the motor 10. In one embodiment, the slope S1 of the angled profiles of the first region of operation θ1 and the slope S3 of the third region of operation θ3 may both be a function of the maximum operating speed of the motor 10 (the maximum speed of the motor 10 varies based on the specific ideal current profile 100A-100N), a phase inductance of the motor 10, and the applied voltage of the motor 10, and may be expressed by Equation 2 as:

$$\text{slope} = \frac{\text{Applied voltage}}{\text{maximum speed} \times \text{phase inductance}} \quad \text{(Equation 2)}$$

The speed range of the motor 10 may be based on the slope (the slope S1 in the first region of operation θ1 or the slope S3 in the third region of operation θ3) of one of the ideal current profiles 100A-100N. That is, if one of the ideal current profiles 100A-100N has a relatively high slope S1 or S3, this results in a lower speed range of the motor 10. For example, the ideal current profile 100A (which is supplied the greatest amount of current to produce the greatest amount of torque to the motor 10 when compared to the remaining current profiles 100B-100N) has the highest slope in both region θ1 and region θ3 when compared to the remaining ideal current profiles 100B-100N. The ideal current profile 100A also produces a lower speed range when compared to the remaining ideal current profiles 100B-100N as the motor 10 operates in either the region θ1 or the region θ3. However, it is to be understood that if the motor 10 operates at variable speed, the motor 10 may not necessarily follow a generally linear profile in the first region of operation θ1 and the third region of operation θ3. Instead, the slope of the ideal current profiles 100A-100N in the first region of operation θ1 and the third region of operation θ3 may vary, and a compensation technique may be used to improve the efficiency of the motor 10.

Figure 5:
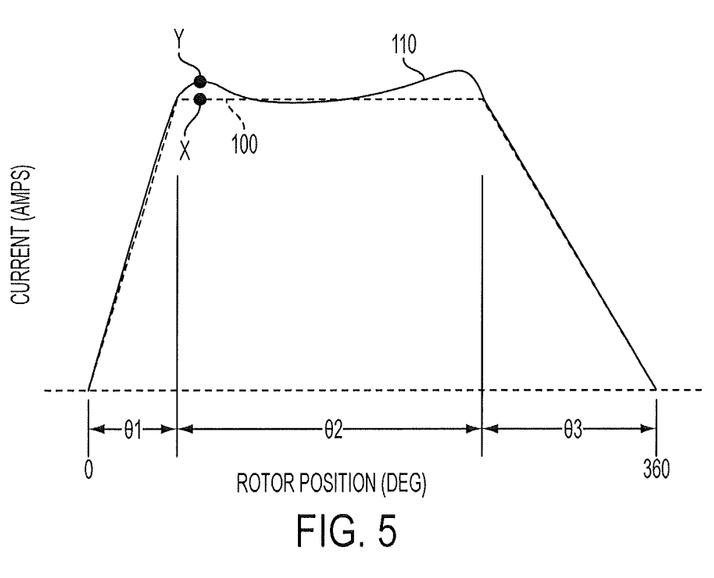
FIG. 5 is an illustration of one of the ideal current profiles shown in FIG. 5 and an adjusted profile, in accordance with yet another exemplary embodiment of the invention.

FIG. 5 illustrates one of the ideal current profiles 100A-100N (e.g., ideal profile 100A, for example) and an adjusted profile 110. The ideal current profile 100 may be adjusted such that the motor 10 (FIG. 1) generates a required amount of torque based on a specific amount of current supplied to the motor 10 at a specified rotor position. The adjustment of the ideal current profile 100 results in the adjusted profile 110. For example, in one approach the motor 10 may be required to generate 1 Nm of torque (where 1 Nm of torque is the required amount of torque) at about 50 Amps of current (where 50 Amps of current is the specific amount of current) based on a specified rotor position of the motor 10 being at a position X (which is shown in FIG. 5 as about ninety degrees). It should be noted that the amount of current that is supplied to the motor 10 (e.g., 50 Amps in this example) is then apportioned to one or more current phases (e.g., phase A, phase B, and phase C). The amount of current that is apportioned to each current phase depends on the specific rotor position of the motor 10. For example, at a rotor position of X, the motor 10 receives 50 Amps of current, where phase A is apportioned about 35 Amps, and phase C is apportioned about 15 Amps. However, it should be noted the apportionment of the current between the various current phases will vary based on the specific rotor position of the motor 10.

Figure 8:
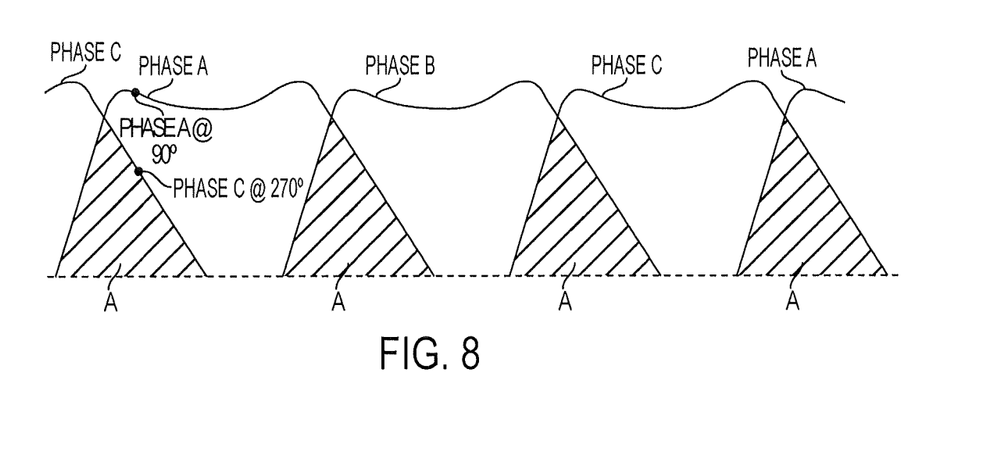
FIG. 8 is an exemplary illustration of a commutation sequence for the motor shown in FIG. 3, in accordance with another exemplary embodiment of the invention.

Referring now to both FIGS. 5 and 8, phase A is at about 90 electrical degrees (and is annotated in FIG. 8) and phase C is at about 270 electrical degrees (and is annotated in FIG. 8). Phase A (which is supplied 35 Amps of current) produces 0.7 Nm of torque, and phase C (which is supplied 15 Amps of torque) produces 0.2 Nm of torque. Thus, at point X (e.g., a rotor position of about ninety degrees) the motor 10 will produce a total of 0.9 Nm of torque (e.g., the torque produced by phase A and phase C are combined). It should be noted that the amount of total torque produced by the motor 10 may vary based on the rotor position of the motor 10. For example, at a rotor position of one hundred and eighty degrees, the total torque produced by the motor 10 may be a different value when compared to the total torque produced by the motor 10 at ninety degrees. This variation in torque output based on rotor position results in torque ripple produced by the motor 10.

Referring now to FIG. 2, the torque-current-angle characteristic graph may be used to determine the amount of torque being produced by the motor 10 as the motor 10 is commutating out of phase C and into phase A. The profile P5 (which, for purposes of this explanation, represents a current supplied to the motor 10 at phase A) indicates that at a rotor position of 90 electrical degrees at phase A, about 0.7 Nm of torque is produced by the motor 10. The profile P7 (which, for purposes of this explanation, represents a current supplied to the motor 10 at phase C) indicates that at a rotor position of about 270 electrical degrees, about 0.2 Nm of torque is produced by the motor 10. Thus, referring to both FIGS. 2 and 5, when a current of about 50 Amps is supplied to the motor 10, this results in about 0.9 Nm of torque being produced by the motor 10.

Referring back to FIG. 5, the ideal current profile 100 is adjusted accordingly to increase the amount of current such that the motor 10 produces 1 Nm of torque. Specifically, point X represents the amount of current needed to produce 0.9 Nm of torque by the motor, and point Y on the adjusted profile 110 represents an increase in current supplied to the motor 10 in order to produce 1 Nm of torque.

FIG. 6 is an illustration of the adjusted profile 110 and a final profile 120 that is generated by calibrating the motor 10 (FIG. 3). Specifically, the motor 10 is calibrated to take into account the mutual coupling effects produced as the motor 10 is commutated in and out of phases (e.g., commutated between phase A, phase B, and phase C, as seen in FIG. 8). This calibration results in the final profile 120. It should be noted that the adjusted profile 110 does not take into account the mutual coupling effects as the motor 10 is commutated (this is because the adjusted profile 110 is based on the T-i-θ characteristic graph illustrated in FIG. 2, which also does not take into account mutual coupling effects of commutation).

The final profile 120 represents the phase current that is provided to the motor 10 to generate the substantially ripple free torque output T, and the values of the final profile 120 are stored in the lookup table 84 shown in FIG. 3. It should be noted that in some embodiments, the phase current represented by the adjusted profile 110 may actually generate torque in the motor 10 that is substantially ripple free. In other words, in some embodiments, calibration may not need to be performed (e.g., the mutual coupling effects produced as the motor 10 is commutated in and out of phases does not need to be taken into account), and instead the current command values stored in the lookup table 84 (FIG. 3) are based on the adjusted profile 110.

Figure 7:
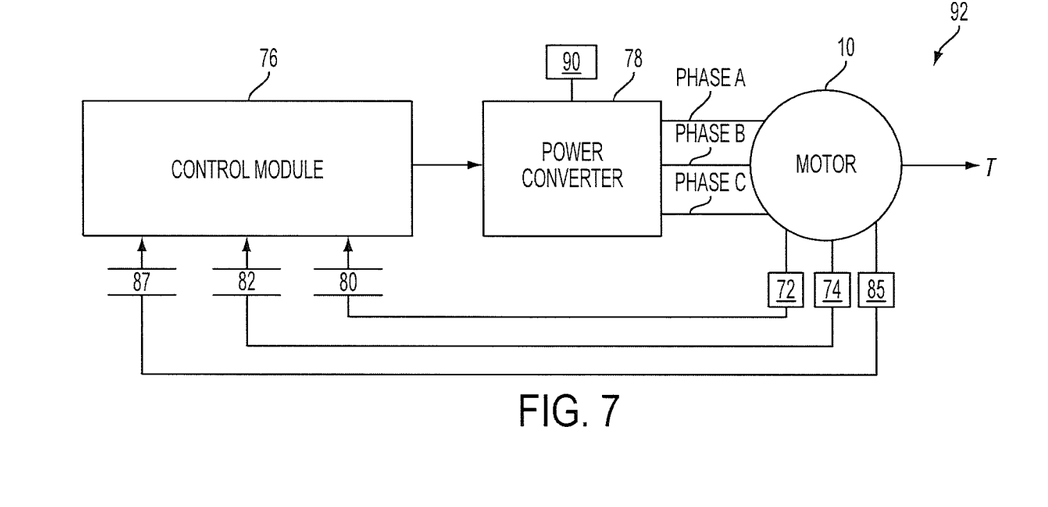
FIG. 7 is an exemplary block diagram of a test set up, in accordance with yet another exemplary embodiment of the invention.

FIG. 7 is an exemplary illustration of a test setup 92 that is used to perform calibration to determine the current phase profile 120 shown in FIG. 6. Referring now to both FIGS. 6-7, during calibration, the position sensor 72 that generates the rotor position signal 80, the current sensor 74 that generates a phase current signal 82, and a torque feedback sensor 85 that generates a torque feedback signal 87 are provided. The torque feedback signal 87 is indicative of the torque output T generated by the motor 10. During testing, a single phase of current (e.g., phase A, phase B, or phase C) following the adjusted profile 110 is initially supplied to the motor 10.

The phase current supplied to the motor 10 (e.g., phase A, phase B, or phase C) is then modified or adjusted based on the phase current signal 82 and the torque feedback signal 87. Specifically, the torque feedback signal 87 is monitored by the control module 76. The torque feedback signal 87 is used during calibration to determine the mutual coupling effects (e.g., between phase A, phase B, and phase C) on torque output by the motor 10. The final profile 120 represents the adjustments made to the phase current to achieve the substantially ripple free torque output T (e.g., torque produced by the motor 10 that is within a predefined range). It should be noted that although FIG. 6 illustrates a single phase, during testing the effects of other current carrying phases are taken into consideration when generating the final profile 120.

Referring to FIG. 6, during calibration the adjusted profile 110 is adjusted within the second region θ2 to determine the final profile 120. Specifically, curved or sloped portions 122 of the adjusted profile 110 at junctions 124 may be modified during testing to determine the final profile 120. The junctions 124 represent where the first region θ1 transitions into the second region θ2, and where the second region θ2 transitions into the third region θ3. Although the final profile 120 is kept relatively similar to the adjusted profile 110 in the first region θ1 and the third region θ3, a slight amount of modification (e.g., generally within a range of up to about four percent) may be performed within the first region θ1 and the third region θ3 to accommodate for the adjustments made to the sloped portions 122 in the second region θ2.

FIG. 8 is an exemplary illustration of a commutation sequence for the motor 10 (FIG. 3) illustrating phase A, phase B, and phase C. Each of the phases (e.g., phase A, phase B, and phase C) are identical to the final profile 120 shown in FIG. 6. The control module 76 (FIG. 3) includes control logic for controlling the commutation sequence of the motor 10 such that phase A, phase B, and phase C create an area A of overlap with one another. Specifically, phase A, phase B, and phase C overlap with one another such that the torque output T of the motor 10 (FIG. 3) is relatively steady. Thus, the commutation of the motor 10 does not generally have an effect on the torque output T of the motor 10.

Figure 9:
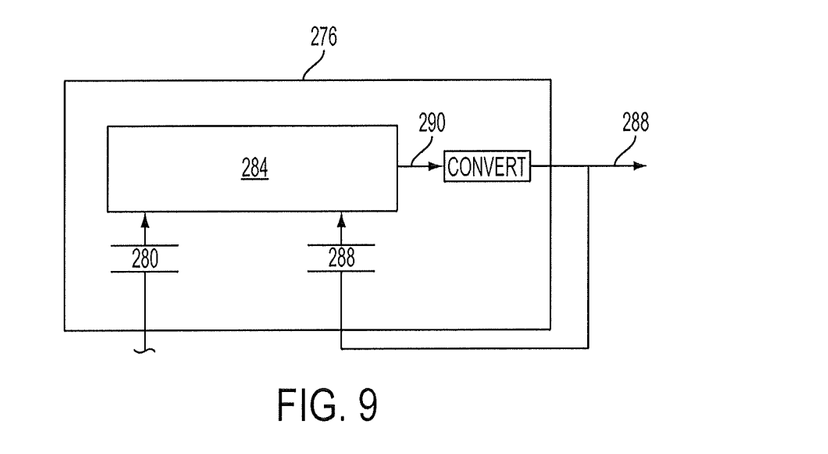
FIG. 9 is an illustration of an alternative embodiment of a control module shown in FIG. 3, in accordance with yet another exemplary embodiment of the invention.

FIG. 9 is an illustration of an alternative embodiment of a control module 276. In the embodiment as shown in FIG. 9, the lookup tables 84 (FIG. 3) have been replaced with a current calculation module 284. The current calculation module 284 receives as input a rotor position signal 280 from the position sensor 72 (FIG. 3), and a torque command signal 288 (the torque command signal 288 is sent to the power converter 78 shown in FIG. 3). The current calculation module 284 determines an instantaneous reference current 290 based on the torque command signal 288 and the rotor position signal 280.

In one embodiment, the instantaneous reference current 290 may be calculated using Fourier series analysis. Specifically, in one approach, the instantaneous reference current 290 is expressed by Equations 3-5:

$$i(T, \theta_e) = \sum_{n=0}^{N} a_n(T)\cos(n\omega_o\theta_e) + b_n(T)\cos(n\omega_o\theta_e) \quad \text{Equation 3}$$

where $$a_n(T) = ap1(n)T^2 + ap2(n)T + ap3(n) \quad \text{Equation 4}$$

and $$b_n(T) = bp1(n)T^2 + bp2(n)T + bp3(n) \quad \text{Equation 5}$$

where i is the instantaneous reference current based on the torque command and rotor position, T is the torque command signal 288, $\theta_e$ is the rotor position signal 280, n is a number of harmonics, $a_n$ is a Fourier coefficient, $b_n$ is a Fourier coefficient, $\omega_o$ is the fundamental frequency, ap1-ap3 are coefficients that are based on the torque command signal 288, and bp1-bp3 are coefficients based on the torque command signal 288. Equations 4 and 5 are second-order quadratic equations based on the torque command signal 288 and the torque command signal 288, where three coefficients are provided (e.g., ap1-ap3 and bp1-bp3). The values of ap1-ap3 and bp1-bp3 depend on the specific harmonic n and the torque command signal T.

The number of harmonics n is based on the torque ripple that may be created by the motor 10 (FIG. 3). Specifically, if substantially free torque ripple is defined as torque ripple within a predefined range, then the number of harmonics n is selected such that the torque ripple created by the output torque T of the motor 10 (FIG. 3) falls within the predefined range. As the number of harmonics n increase, the amount of torque ripple created by the output torque T of the motor 10 decreases. Thus, if the allowable torque ripple is known (e.g., torque ripple that does not exceed about three percent), then the number of harmonics n is selected to achieve the allowable torque ripple.

The specific values of coefficients ap1-ap3 of Equation 4 and bp1-bp3 of Equation 5 are based on the specific harmonic n. Thus, each harmonic n will include unique values for coefficients ap1-ap3 and bp1-bp3. For example, if there are 10 harmonics, the value of coefficients ap1-ap3 and bp1-bp3 may be expressed by a 6×10 matrix, which is expressed below as:

$$f(ap1, ap2, ap3, bp1, bp2, bp3) = \begin{bmatrix} n1(ap1, ap2, ap3, bp1, bp2, bp3) \\ n2(ap1, ap2, ap3, bp1, bp2, bp3) \\ n3(ap1, ap2, ap3, bp1, bp2, bp3) \\ n4(ap1, ap2, ap3, bp1, bp2, bp3) \\ n5(ap1, ap2, ap3, bp1, bp2, bp3) \\ n6(ap1, ap2, ap3, bp1, bp2, bp3) \\ n7(ap1, ap2, ap3, bp1, bp2, bp3) \\ n8(ap1, ap2, ap3, bp1, bp2, bp3) \\ n9(ap1, ap2, ap3, bp1, bp2, bp3) \\ n10(ap1, ap2, ap3, bp1, bp2, bp3) \end{bmatrix}$$

Calculating the instantaneous reference current 290 using the Fourier series equation does not require saving relatively large tables in the memory of the control module 276, and interpolation is not needed to determine the value of the instantaneous reference current 290. The control module 284 may convert the instantaneous reference current 290 into the torque command signal 288 that is sent to the power converter 78 (FIG. 3).

The embodiments as discussed in FIGS. 1-9 will result in the motor 10 producing a torque output that is substantially free of torque ripple. Some types of motors currently available tend to produce a relatively high torque ripple as well as a high acoustic noise. The embodiments as discussed above reduce or substantially eliminate the amount of torque ripple created by the motor 10. If the amount of torque ripple is reduced or substantially eliminated, this also reduces the amount of acoustic noise generated by the motor 10. Moreover, referring to the commutation sequence for the motor 10 in FIG. 8, the area A of overlap with phase A, phase B, and phase C may also be selected to also reduce the amount of torque ripple and acoustic noise produced by the motor 10. Thus, the motor 10 may be used in various applications (e.g., an EPS system) that generally require the motor 10 produce relatively low amounts of torque ripple and acoustic noise.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system, comprising:
    a motor having a rotor and a stator, the motor configured for generating an output torque based on a phase current applied to the motor, the output torque creating a torque ripple that is within a predefined range, the torque ripple is a percentage in difference between a maximum torque output and a minimum torque output compared to an average torque output by the motor over a specified period of time;
    a position sensor for monitoring the motor to determine a rotor position;
    a current sensor for monitoring the motor to determine the phase current;
    a control module in communication with the motor, the position sensor, and the current sensor, the control module including a lookup table that stores values of phase current commands applied to the motor, the phase current commands configured for generating the torque ripple within the predefined range by the motor, the phase current commands stored in the lookup table are based on a specific amount of current supplied to the motor at a specified rotor position of the motor to generate a required amount of torque, the specific amount of current supplied to the motor to generate the required amount of torque is represented by an adjusted current profile, the control module configured for:
        determining a specific phase current command from the lookup table based on the rotor position and the phase current, the phase current command indicating the phase current to be applied to the motor; and
        sending a control signal to the motor for generating the output torque, the control signal based on the specific phase current command.

2. The motor control system of claim 1, wherein the adjusted current profile is modified into a final current profile by accounting for mutual coupling effects produced during commutation of the motor.

3. The motor control system of claim 2, wherein the final current profile is stored in the lookup table, and the phase current commands are based on the final current profile.

4. The motor control system of claim 1, wherein the predefined range of torque ripple does not exceed about two percent.

5. The motor control system of claim 1, wherein the motor is a three-phase motor.

6. The motor control system of claim 1, wherein the motor is a switched reluctance motor (SRM).

7. A method of controlling a motor, the method comprising:
    determining a rotor position of the motor;
    determining a phase current applied to the motor;
    determining a specific phase current command, the specific phase current commands are configured for generating a torque ripple that is within a predefined range by the motor, the specific phase current commands are stored in a lookup table and are based on a specific amount of current supplied to the motor at a specified rotor position of the motor to generate a required amount of torque, the specific amount of current supplied to the motor to generate the required amount of torque is represented by an adjusted current profile;
    sending a control signal based on the specific phase current command to the motor; and generating an output torque by the motor, the output torque creating a torque ripple that is within a predefined range; and
    determining the torque ripple as a percentage in difference between a maximum torque output and a minimum torque output compared to an average torque output by the motor over a specified period of time.

8. The method of claim 7, wherein the motor is a switched reluctance motor (SRM).

9. A motor control system, comprising:
    a motor having a rotor and a stator, the motor generating an output torque based on a torque command signal applied to the motor, the output torque generated creating a torque ripple that is within a predefined range;
    determining an instantaneous reference current based on the rotor position and the torque command signal uses a Fourier series analysis, and is expressed by:

$$i(T, \theta_e) = \sum_{n=0}^{N} a_n(T)\cos(n\omega_o\theta_e) + b_n(T)\cos(n\omega_o\theta_e),$$

i is the instantaneous reference current, T is the torque command signal, $\theta_e$ is the rotor position signal, n is a number of harmonics, $a_n$ is a first Fourier coefficient, $b_n$ is a second Fourier coefficient, and $\omega_o$ is a fundamental frequency;
    a position sensor for monitoring the motor to determine a rotor position of the motor;
    a control module in communication with the motor and the position sensor, the control module configured for:
        receiving as input the rotor position and the torque command signal, the torque command signal based on the instantaneous reference current; and
        sending the torque command signal to the motor.

10. The motor control system of claim 9, wherein the number of harmonics n is based on the torque ripple within the predefined range.

11. The motor control system of claim 10, wherein the first Fourier coefficient $a_n$ and the second Fourier coefficient $b_n$ are calculated by:

$$a_n(T)=ap1(n)T^2+ap2(n)T+ap3(n)$$

$$\text{and } b_n(T)=bp1(n)T^2+bp2(n)T+bp3(n)$$

wherein ap1, ap2, ap3, bp1, bp2, and bp3 are coefficients based on the torque command signal T.

* * * * *